(12) United States Patent
Arte et al.

(10) Patent No.: US 8,949,900 B2
(45) Date of Patent: Feb. 3, 2015

(54) METHOD AND APPARATUS FOR PROVIDING A PERSONALIZED CONTENT CHANNEL

(75) Inventors: Laxmi Arte, Austin, TX (US); Mousumi Dasgupta, Irving, TX (US); Enrique Ruiz-Velasco, Flower Mound, TX (US); Shadman Zafar, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 351 days.

(21) Appl. No.: 12/981,902

(22) Filed: Dec. 30, 2010

(65) Prior Publication Data

US 2012/0174159 A1   Jul. 5, 2012

(51) Int. Cl.
| | |
|---|---|
| G06F 3/00 | (2006.01) |
| G06F 13/00 | (2006.01) |
| H04N 5/445 | (2011.01) |
| H04N 21/658 | (2011.01) |
| H04N 21/2668 | (2011.01) |
| H04N 21/442 | (2011.01) |

(52) U.S. Cl.
CPC ....... *H04N 21/6582* (2013.01); *H04N 21/2668* (2013.01); *H04N 21/44222* (2013.01)
USPC ................... 725/46; 725/43; 725/44; 725/45; 725/47; 725/48

(58) Field of Classification Search
USPC ...................................................... 725/43–48
See application file for complete search history.

(56) References Cited

U.S. PATENT DOCUMENTS

| | | | |
|---|---|---|---|
| 8,037,494 B2 * | 10/2011 | Sie et al. .......................... | 725/45 |
| 2010/0251304 A1 * | 9/2010 | Donoghue et al. .............. | 725/46 |

* cited by examiner

*Primary Examiner* — Pankaj Kumar
*Assistant Examiner* — Charles N Hicks (57) ABSTRACT

An approach is provided for selecting personalized content presented via a set-top box. Viewing data related to content experienced by a user is retrieved. Broadcast content is selected based on the viewing data from a plurality of programs that are designated to broadcast to a plurality of set-top boxes. A personalized programming channel is presented for the user using the selected broadcast content over a particular one of the set-top boxes associated with the user.

20 Claims, 10 Drawing Sheets

METHOD AND APPARATUS FOR PROVIDING A PERSONALIZED CONTENT CHANNEL

BACKGROUND INFORMATION

With readily available, cost-effective broadband services, users now have access to a wealth of television channels, on demand programming, premium broadcasting and the like. Also, the substantial growth in the use of set-top boxes (STBs) have provided viewers with many convenient capabilities, such as digital video recording and content control. Typically, users are presented with a content guide that lists the many content options (e.g., movies, shows, on demand programs, music) and respective channels a user may access. With hundreds of channels available for selection however, users can find the process of selecting desired programming burdensome and time consuming. For example, as the list of content and channels grows longer, the user must tediously scroll through the list in order to see all available options. Given existing user interfaces, there is little or no flexibility in the way that content options are presented to a user or how the user interacts with the STBs to select the various content.

Therefore, there is a need for an approach that provides flexible, efficient techniques to assist with presentation and selection of content via a set-top box.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for personalizing the content viewing and selection process for a user of a set-top box are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
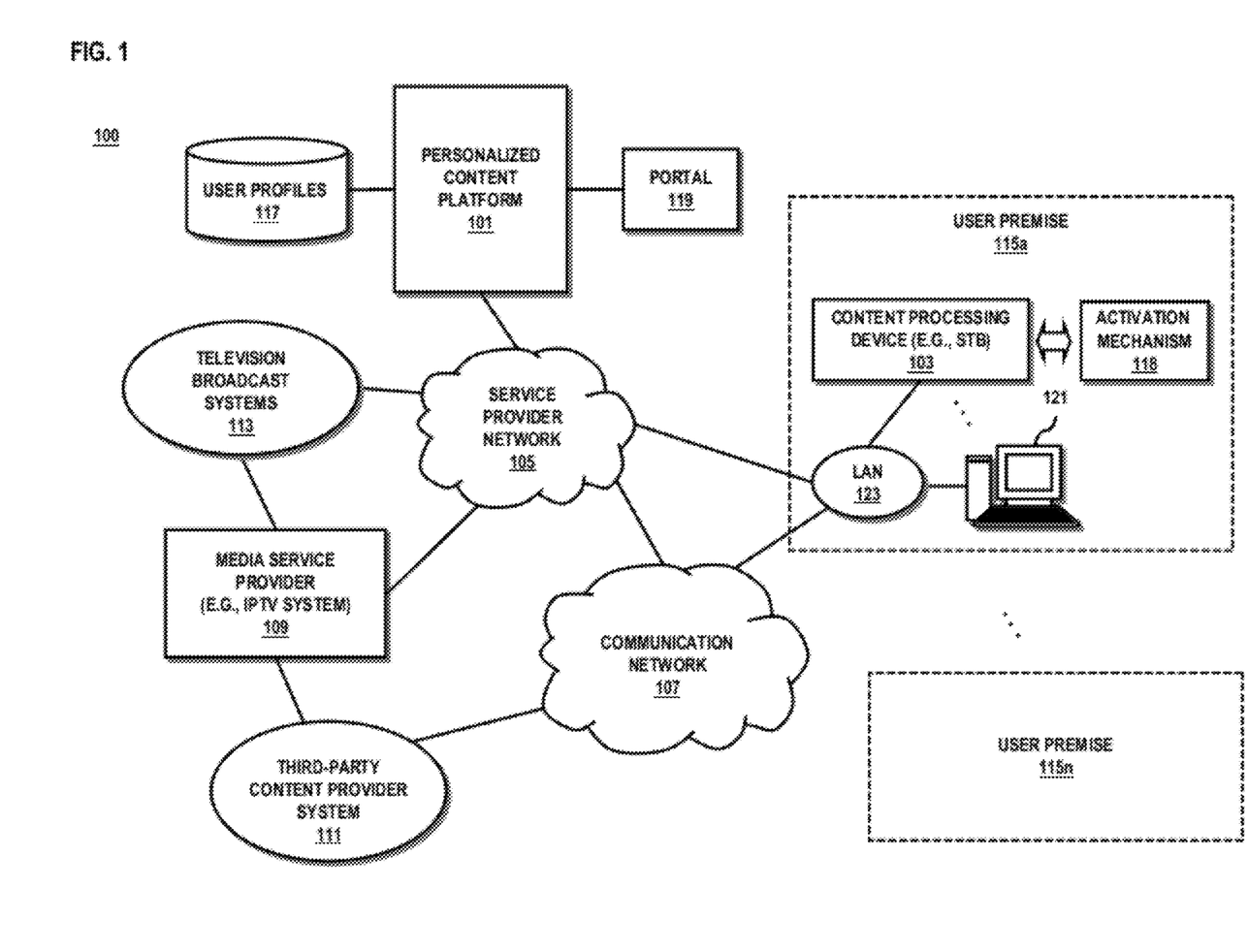
FIG. 1 is a diagram of a system capable of personalizing the content viewing and selection process for a user of a set-top box, according to an exemplary embodiment.

FIG. 1 is a diagram of a system capable of personalizing the content viewing and selection process for a user of a set-top box, according to an exemplary embodiment. For the purposes of illustration, system 100 is described with respect to personalized content platform (or platform) 101 that is configured to interface with content processing devices (e.g., set-top boxes (STBs)) 103 through service provider network 105 and/or communication network 107. In certain embodiments, "content" broadly includes any audio-visual content (e.g., broadcast television programs, Video On Demand (VOD) programs, pay-per-view programs, Internet Protocol television (IPTV) feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, media service provider (MSP) 109 may provide (in addition to their own media content) content obtained from sources, such as one or more third-party content provider systems 111, one or more television broadcast systems 113, etc., as well as content available via one or more communication networks 107, etc.

"Personalized content" or "personalized program(ming)" in certain embodiments, pertains to any content, television programs, broadcasts, on demand movies, music and multimedia made available to a user by a media service provider 109 (MSP) based on user specified or determined preferences selected by the user. By way of example, if a user of a set-top box typically selects crime or drama related movies or programs for viewing, a media service provider 109 can provide recommendations of other movies or television programming of the same genre based on the preference. As will be more fully described, personalized content platform 101 permits such content to be featured for access through a personalized content or programming channel—i.e., a dedicated channel for arranging and presenting personalized content for immediate viewing. In addition, platform 101 provides a means of enabling the user to select other personalized content through the content channel, such that they need only toggle between selections of interest. While specific reference will be made hereto, it is contemplated that system 100 may embody many forms and include multiple and/or alternative components and facilities.

It is observed that television remains the prevalent global medium for entertainment and information as individuals spend a great deal of time tuning into both public television programs as well as paid televised media (e.g., cable television). In addition, movies, music, multimedia and other televised programming may be purchased on-demand from various media services providers in order to further enhance the array of content viewing options. Depending on the range of services offered by a given media services provider 109, viewers may have hundreds of channels to chose from, all of which may feature different types of movies, special features and other content throughout the day and night. Consequently, while a greater preponderance of options introduces wider and more varied choices, this variety also makes it more difficult for the typical user to decide which content to view at any given time. A user can spend a consider amount of time scrolling through a program guide that features the many content options and channels the user can select before finally settling upon a program of interest.

Thus, the approach of system 100, according to certain embodiments, stems from the recognition that consumers can benefit from a more limited and selective array of content for immediate view and navigation via the set-top box through access to a personalized content/programming channel. The platform 101 can recommend programs and/or channels that may be of interest to the user based on their determined preferences, i.e., a "Recommendations for You" message feature that is based on past viewing history. According to certain embodiments, the user subscribes to this feature, which entails collecting the user's history, prior content choices, on demand purchase selections, etc. in order to determine the user's preferences.

By way of this approach, the personalized content channel presents a predetermined set of television programs, movies, music, multi-media and other personalized content, the predetermined set being personalized content. Under this scenario, users may begin immediately viewing content that caters to their interests as the programs available for view at the personalized content channel are predetermined based on user interests. As shown, personalized content platform 101 may be configured to manage operations of a content processing device 103 within a user premise 115. In addition, the personalized content platform 101 coordinates the execution of content processing devices as configured for operation with respect to user preferences. In this manner, system 100 allows users to readily access preferred content or programs without having to toggle between multiple channels, invoke multiple content frames, or scroll through a long program guide or list.

In one embodiment, the personalized viewing platform 101 is configured to maintain one or more user profiles 117 for managing the operation of respective content processing devices 103, DVR system (not shown) and other devices respective to a given user. The user profile 117 may include data for identifying the user, including a radio-frequency identifier (RFID), an identification code, a user identifier value or other machine-readable or detectable information. Also, the user profile may include data specifying the name, address, and other contact details of the user, as well as data representative of content (e.g., television programs, movies, music) of general interest to the user. By way of example, at a time of initial service registration, a user may specify general categories or genres of programming of interest to them. It is noted, however, that user specified profile information of this nature as it pertains to the viewing preferences of the user may differ from the determined viewing behavior of the user. Nonetheless, the user profile may be utilized by the personalized content platform 101 for enabling the formation of a personalized content channel for the user (relative to the profile).

In addition, the user profile may also indicate various content processing device configuration preferences, content, broadcast or programming preferences and features, and other characteristics for customizing the user content display and viewing experience. In this scenario, for example, one user may prefer that content be presented along with captions, while another user may prefer content to be presented without captions. By way of example, content processing device configuration data can relate to monitor size, audio/video interface setup (e.g., High-Definition Multimedia Interface (HDMI)), audio settings, time zone, network address settings, etc), programming guides (e.g., available channels, blocked and hidden channels settings, skin preferences, customizations, etc.) and personal recording settings (e.g., show names, times record types (e.g., all, single, series, latest), record channels, etc.)).

In certain embodiments, a portal 119 interfaces with platform 101 to permit access by users via STBs/content processing devices 103 and/or computing device 121 (e.g., laptop, desktop, web appliance, netbook, etc.). Portal 119 provides, for example, a web-based user interface to allow users to set and update user profile information 117 and various features of the personalized content platform 101. In certain embodiments, the content processing device 103 may present the user interface directly, enabling the user to modify settings by way of a keyboard, remote control, touchable display or other data entry mechanism. In the case of a remote control, touchable display or other activation mechanism 118, personalized content platform 101 may be configured to enable activation and viewing of personalized content based on user selection of a "hot-button." Under this scenario, the hot-button activates the personalized content channel, enabling the user to immediately view personalized content as well as select other content that has been predetermined to conform to their preferences. It is noted the personalized content channel provides a time saving, more direct alternative to recommended on-demand content or an exhaustive programming guide.

By way of example, content processing device 103 and/or computing device 121 may be configured to communicate using one or more of networks 105 and 107. System 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G or 4G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 103 to various sources of media content, such as one or more third-party content provider systems 111. Although depicted in FIG. 1 as separate networks, communication network 107 may be completely or partially contained within service provider network 105. For example, service provider network 105 may include facilities to provide for transport of packet-based communications.

According to certain embodiments, content processing devices 103 and/or computing devices 121 may be configured to communicate over one or more local area networks (LANs) 123 corresponding to user premises 115a-115n. In this manner, routers (not shown) may be used for establishing and operating, or at least connecting to, a network such as a "home" network or LAN 123, and is used to route communications within user premises 115a-115n. For example, content processing device 103 may be a set-top box communicatively coupled to LAN 123 via a router and a coaxial cable, whereas computing devices 121 may be connected to LAN 123 via a router and a wireless connection, a network cable (e.g., Ethernet cable), and/or the like. It is noted, however, that in certain embodiments content processing device 103 may be configured to establish connectivity with LAN 123 via one or more wireless connections. Further, content processing device 103 and computing device 121 may be uniquely identified by LAN 123 via any suitable addressing scheme. For example, LAN 123 may utilize the dynamic host configuration protocol (DHCP) to dynamically assign "private" DHCP internet protocol (IP) addresses to content processing device 103 and computing devices 121, i.e., IP addresses that are accessible to devices such as devices 103 and 121 that are part of LAN 123 facilitated via router, i.e., connected to a router.

Figure 2:
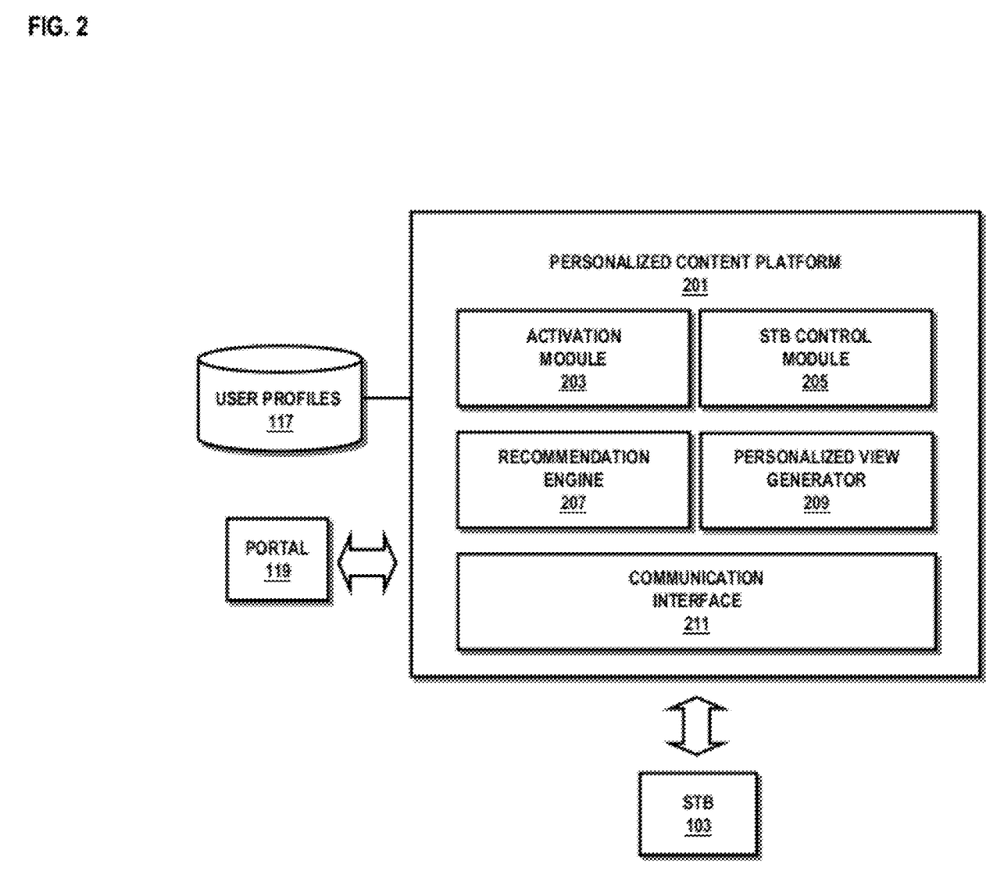
FIG. 2 is a diagram of a personalized content platform configured to support personalized content viewing and selection by a user of a set-top box, according to an exemplary embodiment.

FIG. 2 is a diagram of a personalized content platform configured to support personalized content viewing and selection by a user of a set-top box, according to an exemplary embodiment. The personalized content platform (or platform 101) 201 may comprise computing hardware (such as described with respect to FIG. 9), as well as include one or more components configured to execute the processes described herein for personalizing the content viewing and selection process for a user of a set-top box. In one implementation, platform 201 includes communication interface 211, activation module 203, set-top box control module 205 809, recommendation engine 207 and personalized view generator 209. Communication interface 211 provides connectivity to one or more content processing devices within a given user premise 115. Interface 211 can also communicate with various service provider systems 105 or communication systems 107 for supporting network communication and interaction. Still further, the communication interface 211 can also support execution of a web portal 119 for enabling user to access to platform 101 via a browser application or the like.

In one embodiment, an activation module 203 receives notification of a request signal at a set-top box for indicating activation of the personalized content channel. The signal is generated by pressing a "hot-button" of a remote control device, at the touch screen or by way of a channel selection button via any known activation mechanism 118. Also, the activation module 203 initiates establishment of a user profile directly from a display at the STB 103 by way of the portal application 119. Under this scenario, the activation module 203 operates in connection with a STB control module 205 to generate a message to be prompted at a display of the set-top box for indicating a profile does not exist and/or needs to be established. By way of example, activation module can present the user with an onscreen or virtual keyboard for inputting profile data or alternatively, the user may operate a peripherally connected keyboard or data entry device. In addition, the activation module may support the presentment of messages to a user pertaining to the activation of additional services, features and subscriptions (e.g., up sell messaging). It is noted that the messaging may be based on the preferences of the user.

A set-top box (STB) control module 205 operates, in one embodiment, to generate various control signals and messages for affecting the behavior of a set-top box 103 and other interconnected devices (e.g., a digital video recorder). The control signals are generated by the STB control module 205 for rendering specific content and other items to the display in conjunction with the specific APIs, graphics primitives, display features and operating system (OS) of the STB 103. In addition, the STB control module 205 operates in connection with a personalized view generator 209 in order to package personalized content for being rendered to the display of the STB 103.

The personalized view generator 209, in one embodiment, packages personalized content based on the results of a recommendation engine 207 for detecting and gathering user viewing data and preferences, and generates the personalized content or program channel for direct user access. By way of example, the personalized view generator 209 determines an order of programs, televised media, movies and other content to present to a user via the display of the STB 103. In addition, the personalized view generator 209 generates a personalized content selector, a user interactive control and/or widget for enabling a user to quickly select additional recommended content directly at the personalized content channel. The personalized content selector may be presented as an overlay atop currently running personalized content for scrolling between and selecting personalized content, etc. It is noted the personalized content selector is limited to presentment of only recommended content as opposed to all content/channels available to the user by way of a content guide or other data view, such that limited, single button or single data view selection of a recommendation is supported. It is also noted the personalized content selector is packaged to conform to the size and dimensions of the display.

In one embodiment, the recommendation engine 207 periodically compiles information indicative of user viewing preferences, including data representative of television shows, programs, multimedia and other content traditionally viewed, recorded or purchased by the user. In addition, statistic and/or characteristic data regarding the content such as associated genre preferences, traditional viewing times, typical network or channel preferences, etc. In general implementations, recommendation engines form or work from a specific type of information filtering system technique that attempts to recommend information items (movies, TV program/show/episode, video on demand, music, etc.) that are likely to be of interest to the user based on the above described compiled reference characteristics and/or statistics. In certain implementations, the recommendation engine 207 may compare user profile data 117 to some of the determined (e.g., collected) reference characteristic data, so as to generate a rating or prediction of the likelihood of a user having an interest in content they had not yet considered, an interest in data they historically viewed, an interest in a specific genre or category of programming, etc. Any known or state-of-the-art approaches for implementation of a recommendation engine 207 may be employed. It is noted that the rating or prediction generated by the recommendation engine 207 is provided to the personalized view generator 209 for appropriately selecting and compiling content for presentment via the personalized content channel of a user.

While specific reference will be made to the above described implementation, it is also contemplated that platform 201 may embody many forms and include multiple and/or alternative components. For example, it is contemplated that the components of platform 800 may be combined, located in separate structures, and/or separate locations. By way of example, platform 101 may be implemented in accordance with a cloud-based server implementation.

FIGS. 3A-3D are flowcharts of processes for personalizing the content viewing and selection process for a user of a set-top box, according to various embodiments. For the purpose of illustration, the processes are described with respect to FIG. 1. It is noted that the steps of the process may be performed in any suitable order, as well as combined or separated in any suitable manner. In step 301 of process 300, the personalized content platform 101 retrieves viewing data related to content experienced by a user. In step 303, the personalized content platform 101 selects broadcast content based on the viewing data—i.e., prior viewing history, preferred content, specified preferences—from a plurality of programs that are designated to broadcast to a plurality of set-top boxes. A recommendation engine may be employed, for example, for gathering such data. Next, in step 305, the personalized content platform 101 presents a personalized programming channel for the user using the selected broadcast content over a particular one of the set-top boxes associated with the user.

Figure 3A:
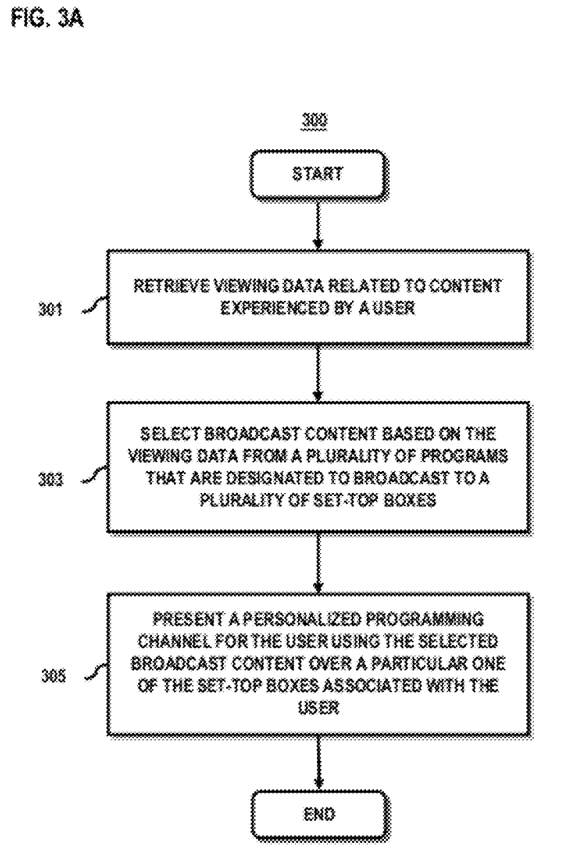
FIGS. 3A-3D are flowcharts of processes for personalizing the content viewing and selection process for a user of a set-top box, according to various embodiments.
Figure 3B:
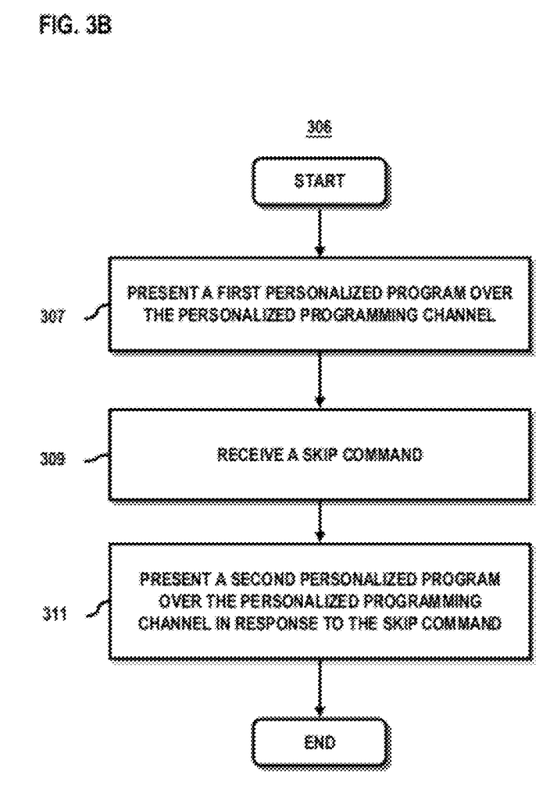

As seen in FIG. 3B, process 306 involves the personalized content platform 101, as in step 307, presenting, via the particular set-top box, a first personalized program over the personalized programming channel. As mentioned, the personalized programming channel features content and program options available to the user based on their determined or specified preferences. In step 309, the personalized content platform may receive, via the set-top box, a skip command. In another step 311, the personalized content platform 101 presents via the set-top box a second personalized program over the personalized programming channel in response to the skip command.

Figure 3C:
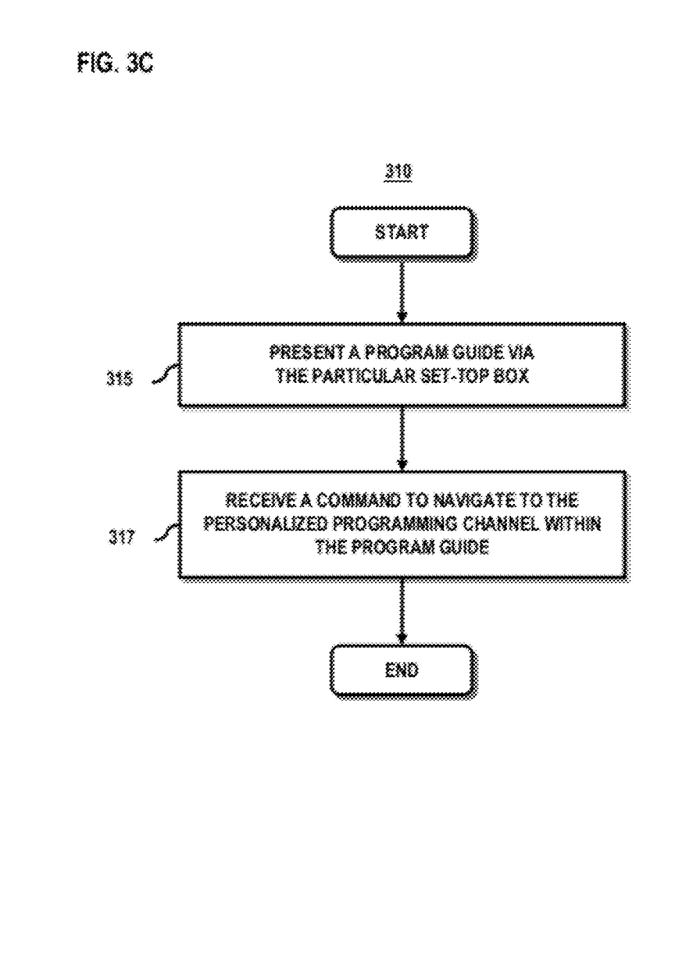

In process 310, the personalized content platform 101 presents a program guide via the particular set-top box through which content is to be displayed, corresponding to step 315. As mentioned, the program guide features all the channels available to the user of the set-top box, including the personalized programming channel. Hence, in step 317, the personalized content platform 101 receives a command to navigate to the personalized programming channel with the program, corresponding to step 313. It is noted that the personalized content platform 101 designates a predetermined number of personalized programs for selection at the personalized programming channel. The number of programs available for selection, and therefore, predetermined, may vary depending on the user and/or their determined or specified viewing data.

Figure 3D:
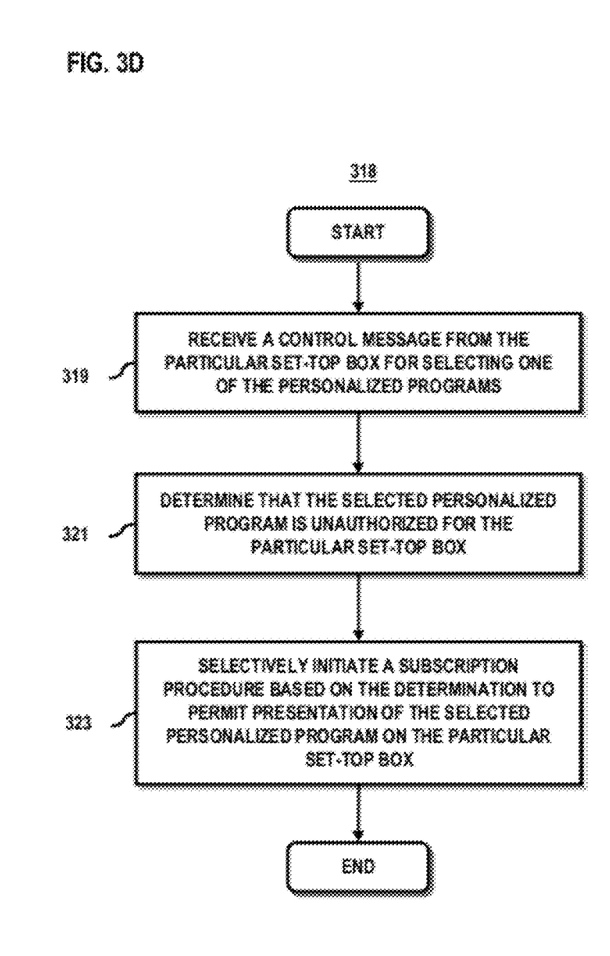

In step 319 of process 318, the personalized content platform 101 receives a control message from the particular set-top box for selecting one of the personalized programs. The control message, as mentioned, may be executed by way of any activation mechanism, including a remote control, touch display panel, etc. In step 321, the personalized content platform 101 determines that the selected personalized program is unauthorized for the particular set-top box. In another step 323, the personalized content platform 101 selectively initiates a subscription procedure based on the determination to permit presentation of the selected personalized program on the particular set-top box.

Figure 4:
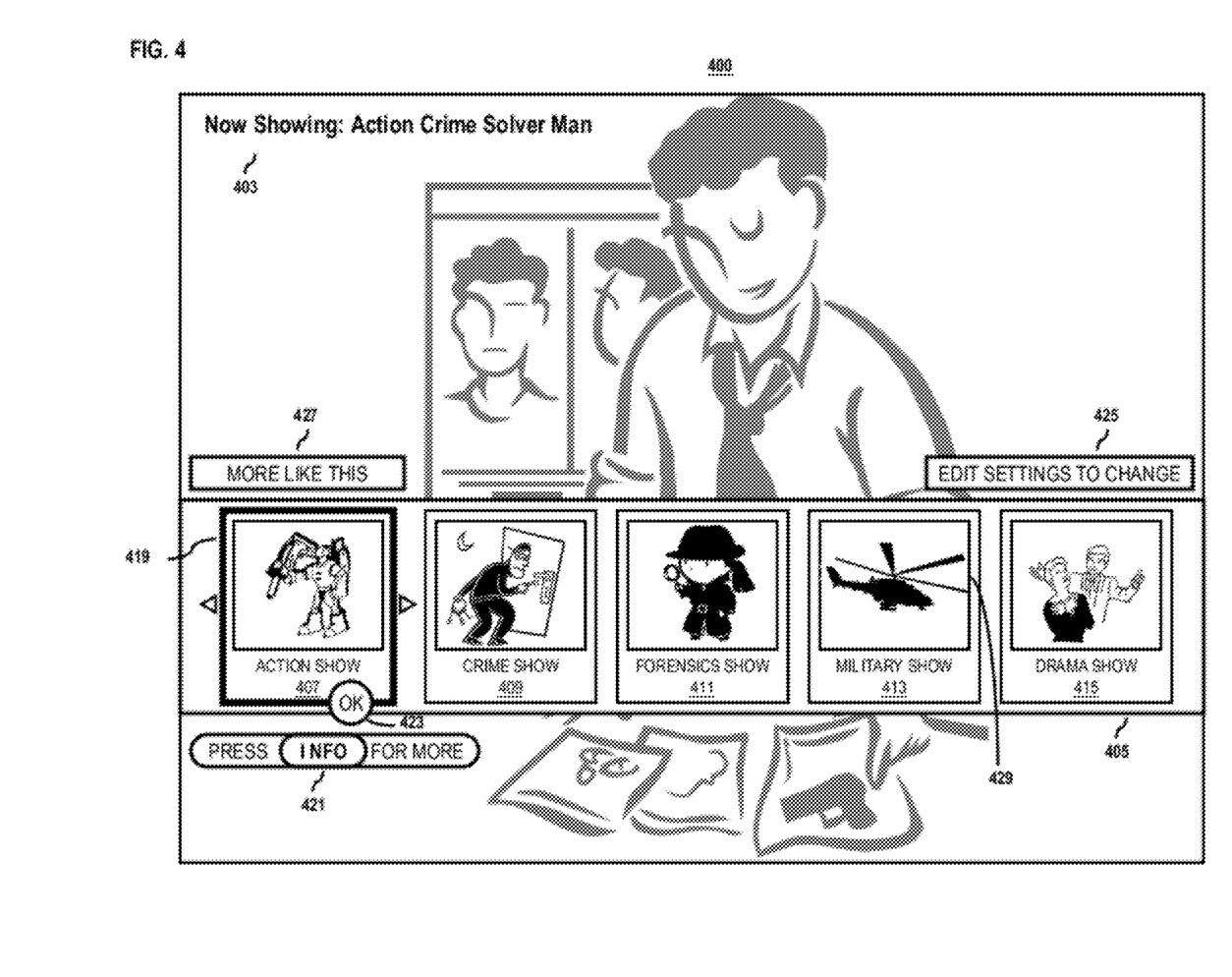
FIGS. 4-6 are diagrams of a display of a set-top box for presenting a personalized content channel for access by a user of the set-top box, according to an exemplary embodiment.
Figure 5:
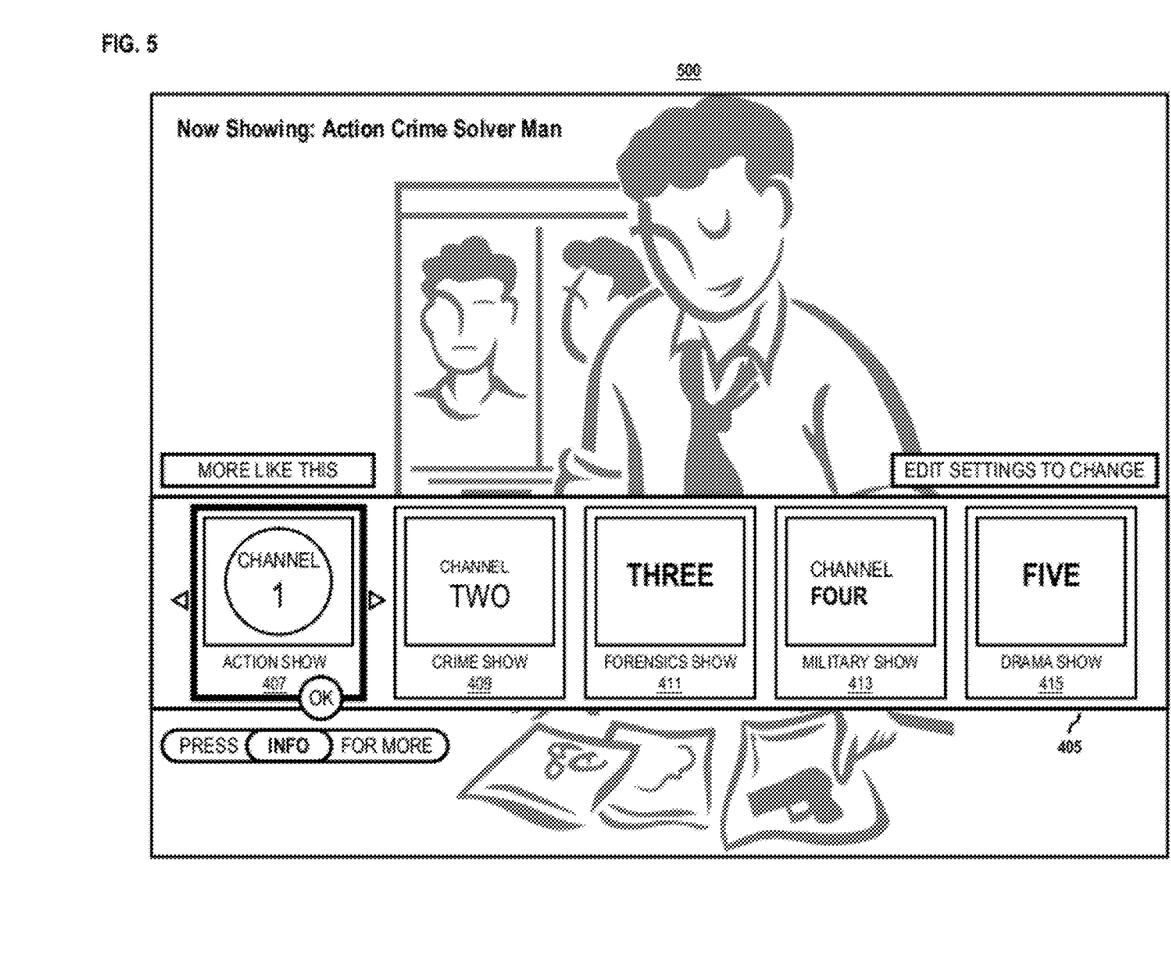
Figure 6:
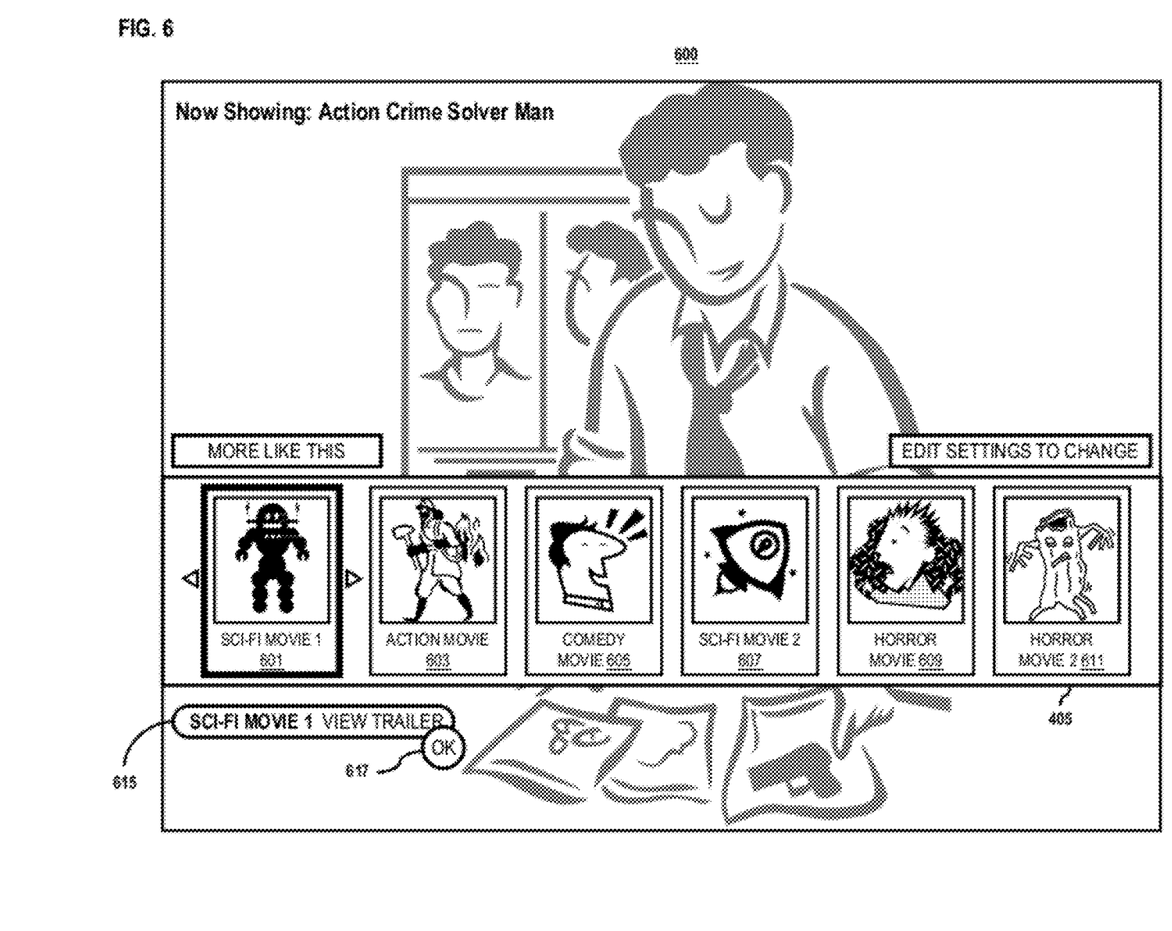

FIGS. 4-6 are diagrams of a display of a set-top box for presenting a personalized content channel for access by a user of the set-top box, according to an exemplary embodiment. For purposes of illustration, FIGS. 4-6 are described within the context of an exemplary use case of a user interacting with an STB to select content to view. Under this scenario, a user navigates to the personalized content channel, which may be featured as one or many channels for selection in the all inclusive program guide. Alternatively, the user proceeds directly to the personalized content channel by way of a hot button at a remote control device, touch display or other activation mechanism 118. Upon selecting the channel, a first recommended show and/or channel (e.g., content) 401 is presented for immediate view to the display 400 of the STB 103. The first recommended show is based on the current time of day for the availability of linear television programs, determined viewing preferences of the user as detected via the recommendation engine 207 of the personalized content platform 101, specified preferences of the user as indicated in a user profile 117 as maintained by the platform 101, or a combination thereof. By way of example, the first recommended show is "Action Crime Solver Man," which depending on the features of the STB 103, is displayed as a caption 403.

Also featured to the display is the personalized content selector 405 for enabling a user to select additional predetermined/personalized content available for viewing through the personalized content channel. As an example, if the user does not like the current show being presented, they may skip to the next show recommended show as featured or indicated for selection via the personalized content selector 405. The personalized content selector 405 is presented to the display featuring content (or channels) for selection that are of a similar nature—i.e., those that correspond to the genre, category or type determined to be of interest to the user.

As mentioned previously, the personalized content selector 405 is presented to the display as a widget or interactive control that overlays the currently playing content. In the scenario depicted in FIG. 4, the additional recommended options correspond to "Action Show" 407, "Crime Show" 409, "Forensics Show" 411, "Military Show" 413 and "Drama Show" 415, all of which are similar to or based upon the first (current) show being viewed as selected based on user determined preferences. Each show is presented in association with an image 429 depicting the show, i.e., an image of a lead character, scene from the show, commonly used identifier or symbol for the show, etc. It is noted that while the above described names of shows 407-415 are generic in nature and may be seen as corresponding to a particular category or genre, the names would typically be that of the program (e.g., Forensics Show would be "Bones", Crime Show would be "CSI: NY", etc.).

The user may utilize the remote, touch activated display or other activation mechanism to toggle between the various options 407-415. When the user skips to a particular content option be it forward or backward, that option is highlighted, represented in this example by bold line 419 surrounding "Action Show" 407 (the current option selected by the user. The user is able to skip back and forth between the various recommendations presented for selection. Once a user skips through all available content selections 407-415, the personalized content selector cycles the user back to the first selection 407. As a widget, the personalized content selector 405 of the personalized channel may be hidden from view by the user on commend so as to not interfere with currently displayed content. Also, the personalized content selector 405 may feature an "OK" button 421 for indicating selection. Until selection of a particular content option is made, the currently running content (e.g., Action Crime Solver Man) will continue to be rendered to the display.

It is noted that the number of recommendations is predetermined, and in general, limited to only those content options rated or determined to be of most interest to the user based on their preferences and the current time of day. Of particular note, the shows 407-415 presented for selection within the personalized content selector 405 are limited to a number useful for supporting quick, convenient selection of personalized content rather than overwhelming the user with too many choices. However, when a user wants to see additional recommendations, they may select a "More Like This" link 427, which updates the content selections that are presented via the selector 405. By way of example, the selections presented may be those that were the next highest rated recommendations for the user. Alternatively, if the user wants to see a full list of all recommended selections, the personalized content selector 405 also features an information tool. By way of example, if the user selects the "Info" button 421 instead of the "OK" button 423 for confirming selection of specific content 407-415, the personalized content platform 101 will instruct the STB 103 to present a full screen application (not shown) listing all personalized content recommendations for the user. The selections are listed by linear TV program order and availability, video-on-demand (VOD) recommendations as well as any up sell services, subscription or content available to the user by way of their media services provider (MSP) 109. Under this scenario, when a channel or service is determined to be of possible interest to the user, but is not one the user is currently subscribed to via the MSP 109, an up sell message (e.g., for the purchase of premium channels or PPV) may be presented to the screen, such as by way of the activation module.

In certain embodiments, the user may also edit the settings of the personalized content selector 405 by adapting their user profile. By way of example, the user may determine that the content presented by the personalized content selector 405 is not suitable to their taste, upon which they may select an "Edit Settings to Change" link for enabling them to indicate content preferences in their personal profile. This approach may be necessary in instances where the user has not yet generated any viewing data, i.e., prior viewing history, or during a time of initial registration of a user for establishment of a personalized content channel.

In FIG. 5, the personalized content selector 405 as presented to the display 500 presents one or more channels as selection options corresponding to the particular shows of potential interest (as recommended) to the user. By way of this example, "Action Show" 407, "Crime Show" 409, "Forensics Show" 411, "Military Show" 413 and "Drama Show" 415 correspond to Channel 1, Channel 2, Channel 3, Channel 4 and Channel Five respectively. It is noted that in FIG. 4, where a visual image 429 representative of the show was shown in association with a particular show 407-415, under this scenario a logo representative of the corresponding channel/network station is shown (e.g., Channel 1 corresponds to FOX TV while Channel 2 corresponds to CBS).

In FIG. 6, the personalized content selector 405 as presented to the display 600 presents one or more movies as selection options, the movies being those determined by the personalized content platform 101 as being of potential interest to the user. By way of this example, the user may select "Sci-Fi Movie 1" 601, "Action Movie" 603, "Comedy Movie" 605, "Sci-Fi Movie 2" 607 and "Horror Movie" 609 and "Horror Movie 2" 611. As with the channel or content options, a visual image depicting or representing the movie may be presented in association with each movie 601-611 option. A movie trailer tool 615 is provided via the personalized content selector for enabling a user to view a trailer pertaining to a particular movie selection 601-611. The user may select an "OK" button 617 to begin viewing a trailer for a currently highlighted movie selection, which under this scenario is "Sci-Fi Movie 1" 601. It is noted that while the above described names of movies 601-611 are generic in nature and may be seen as corresponding to a particular category or genre, the names would typically be that of the movie (e.g., Sci-Fi Movie would be "Star Trek", Action Movie would be "Iron Man", etc.).

Figure 7:
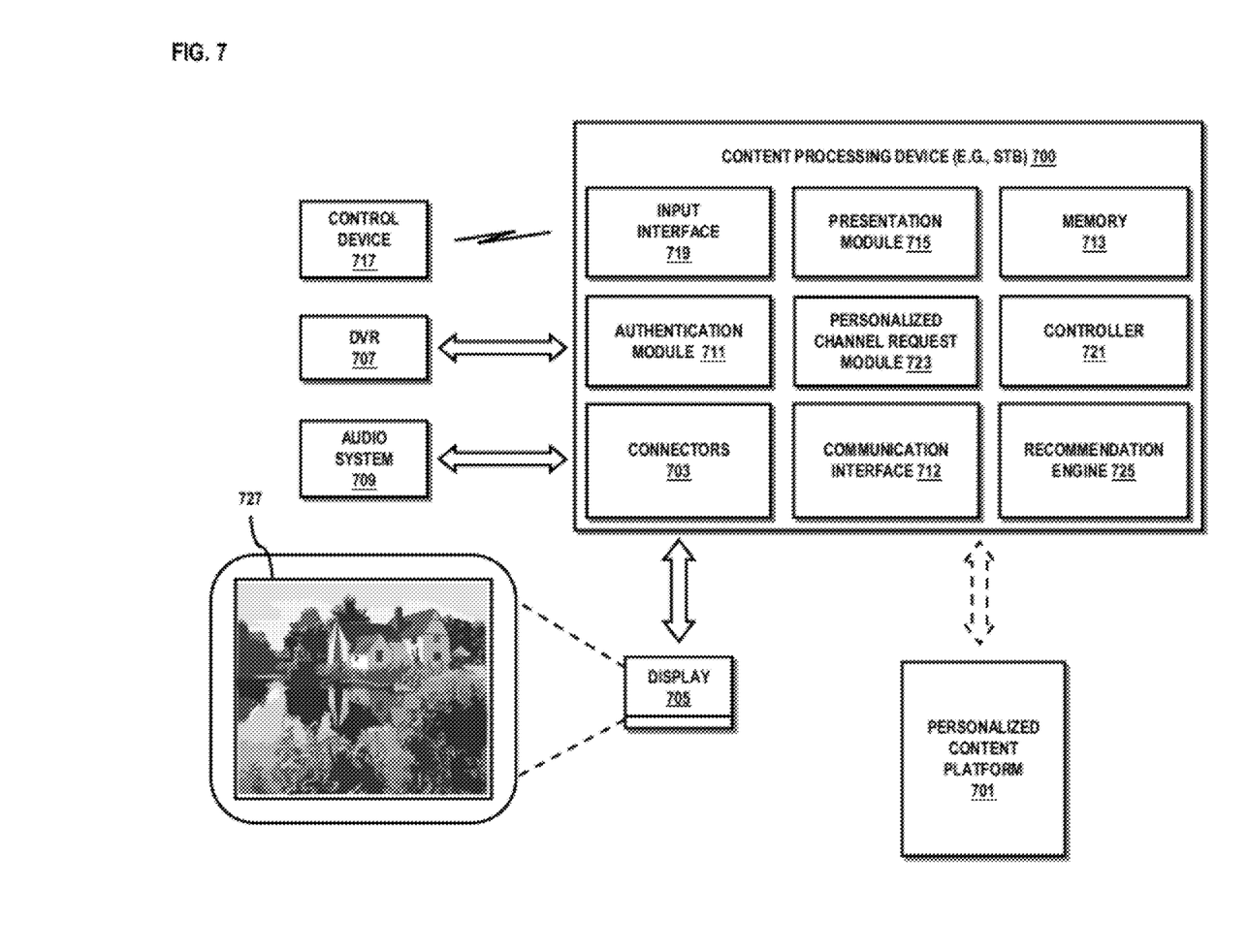
FIG. 7 is a diagram of a content processing device operable in connection with the personalized content platform, according to an exemplary embodiment.

FIG. 7 is a diagram of a content processing device (e.g., set-top box) operable in connection with the personalized content platform, according to an exemplary embodiment. Content processing device (or device) 700 may comprise any suitable technology to receive one or more content streams from a media source, such as MSP 109 and one or more third-party content provider systems 111. The content streams include media content retrieved over one or more data networks (e.g., networks 105 and/or 107), in response to commands from one or more media applications. It is noted the content processing device 700 may, in certain embodiments, employ a recommendation engine 725 for detecting and gathering information pertaining to the content, program and channel preferences and likes of a given user. Data collected by the recommendation engine 725 at the set-top box may be shared with the personalized content platform 701.

According to various embodiments, device 700 may also include inputs/outputs (e.g., connectors 703) to display 705 and DVR 707, as well as to audio system 709. In particular, audio system 709 may comprise a conventional audio-video receiver capable of monaural or stereo sound, as well as multichannel surround sound. Audio system 709 may include speakers, ear buds, headphones, or any other suitable component configured for personal or public dissemination. As such, content processing device 700, display 705, DVR 707, and audio system 709, for example, may support high resolution audio and/or video streams, such as high definition television (HDTV) or digital theater systems high definition (DTS-HD) audio. Thus, content processing device 700 may be configured to encapsulate data into a proper format with required credentials before transmitting onto one or more of the networks of FIG. 1 and de-encapsulate incoming traffic to dispatch data to display 705 and/or audio system 709. In addition, the content processing device 700 may permit the embedding or overlay of messages atop content rendered to the display 705, including messages generated by the activation module 203 or personalized view generator 209 of the personalized content platform 101.

In an exemplary embodiment, display 705 and/or audio system 709 may be configured with internet protocol (IP) capability (i.e., includes an IP stack, or is otherwise network addressable), such that the functions of content processing device 700 may be assumed by display 705 and/or audio system 709. In this manner, an IP ready, HDTV display or DTS-HD audio system may be directly connected to one or more service provider networks 105 and/or communication networks 107. Although content processing device 700, display 705, DVR 707, and audio system 709 are shown separately, it is contemplated that these components may be integrated into a single component, or other combination of components.

An authentication module 711 may be provided by content processing device 700 to initiate or respond to authentication schemes of, for instance, service provider network 105, third-party content provider systems 111, or various other content providers, e.g., television broadcast systems 113, etc. Authentication module 711 may provide sufficient authentication information, e.g., a user name and password, a key access number, a unique machine identifier (e.g., MAC address), and the like, as well as combinations thereof, to a corresponding communications (or network) interface 712 for establishing connectivity, via LAN 123, and to seamless viewing platform 701. Authentication at content processing device 700 may identify and authenticate a second device (e.g., computing device 121) communicatively coupled to, or associated with, content processing device 700, or vice versa. Further, authentication information may be stored locally at memory 713, in a repository (not shown) connected to content processing device 700, or at a remote repository (e.g., user profile repository 117).

Authentication module 711 may also facilitate the reception of data from single or disparate sources. For instance, content processing device 700 may receive broadcast video from a first source (e.g., MSP 109), signals from a media application at second source (e.g., computing device 121), and a media content stream from a third source accessible over communication networks 107 (e.g., third-party content provider system 111). As such, display 705 may present the broadcast video, media application, and media content stream to the user, wherein content processing device 700 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 711 can authenticate a user to allow them to interact with one or more third-party subscriber account features associated with third-party content provider systems 111.

Presentation module 715 may be configured to receive media content streams (e.g., audio/video feed(s) including media content retrieved over a data network) and output a result via one or more connectors 703 to display 705 and/or audio system 709. In this manner, presentation module 715 may also provide a user interface for a media application via display 705. Aural aspects of media applications may be presented via audio system 709 and/or display 705. In certain embodiments, media applications, such as media manager 701, may be overlaid on the video content output 707 of display 705 via presentation module 715. The media content streams may include content received in response to user input specifying media content that is accessible by way of one or more third party content provider systems 105 and, thereby, available over at least one data network (e.g., network 105 and/or 107), wherein the media content may be retrieved and streamed by content processing device 700 for presentation via display 705 and/or audio system 709. Accordingly, presentation module 715 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 703 may provide various physical interfaces to display 705, audio system 709, as well as other peripherals; the physical interfaces may include, for example, RJ45, RJ11, high definition multimedia interface (HDMI), optical, coax, FireWire, wireless, and universal serial bus (USB), or any other suitable connector. The presentation module 715 may also interact with activation mechanism 717 for determining particular media content that a user desires to experience. In an exemplary embodiment, activation mechanism 717 may comprise a remote control (or other access device having control capability (e.g., computing device 121), a wireless user device, mobile phone, etc.) that provides users with the ability to readily manipulate and dynamically modify parameters affecting the media content being viewed. In other examples, content processing device 700 may be configured for voice recognition such that content processing device 700 may be controlled with spoken utterances.

In this manner, activation mechanism 717 may include (not shown) a cursor controller, trackball, touch screen, touch pad, keyboard, and/or a key pad for activating a media application, navigating through broadcast channels, search results, and/or media content identifiers, as well as performing other control functions. For instance, activation mechanism 717 may be utilized to maximize a media application, navigate through displayable interfaces, locate/specify/retrieve media content, modify content processing device 700 parameters, or toggle through broadcast channels and/or media content identifiers. Activation mechanism 717 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols and the like.

Further, activation mechanism 717 may comprise a memory (not illustrated) for storing preferences affecting media content viewed, which can be conveyed to content processing device 700 through an input interface 719. Input interface 719 may support any type of wired and/or wireless link, e.g., infrared, radio frequency (RF), BLUETOOTH, and the like. Thus, activation mechanism 118 may store user preferences with respect to media content, such as favorite sources, etc. Alternatively, user preferences may be tracked, recorded, or stored at content processing device 700 or at a network user profile repository 117. The preferences may be automatically retrieved and activated by a user at any time. It is noted that activation mechanism 717 may be separate from content processing device 700 or may be integrated within content processing device 700, in which case certain input interface hardware and/or software may be superfluous.

Particular embodiments enable users, via activation mechanism 717, to populate or otherwise configure a user profile. For instance, a user profile application may be provided or accessed by content processing device 700 to enable users to populate a plurality of entry fields with user information. A user profile may include one or more customized or personalized settings that affect any aspect of media content accessible via content processing device 700. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/subjects, a "blacklist" specifying one or more media content sources/subjects, as well as other equivalent customized settings, such as color schemes, sound effects, etc.

In other embodiments, the user profile may be established using the additional access devices described earlier (e.g., computing device 121, etc.). As such, user profile information may be stored at content processing device 700, e.g., at memory 713, and/or at a user site repository (not illustrated) directly connected to content processing device 700. Additionally or alternatively, profile information may be stored in a network-based repository (e.g., remote user profile repository 117), activation mechanism 717 and/or any other storage medium. Similarly, content processing device 700 (via memory 713), a user site repository and/or a network-based repository may store a collection of digital audio, video and/or image content accumulated by a user. This collection may also include a plurality of identifiers, links, search results, or bookmarks to media content accessible over one or more communication networks 107, wherein selection of a particular identifier, link, search result, or bookmark may cause one or more media applications to obtain the content from an associated link (either directly from a data network source (e.g., content repository (not shown)) or indirectly from third-party content provider system 111 and/or MSP 109).

Personalized channel request module 723 receives a control signal or user provided input for indicating the user wants to access the personalized content channel. Upon receipt, the personal channel request module 723 transmits the request, via the communication interface 712, to the personalized content platform 101. It is noted that in instances where no prior user viewing has occurred—i.e., sufficient enough to provide recommended content—the personalized channel request module 723 generates a message indicating this to the user via the display 705.

It is noted that the exemplary methods and systems presented in various embodiments enable a means of convenient, efficient access to personalized content. In addition, the techniques presented enable preference based content to be readily selected and reviewed in accordance with linear TV programming. An advantage to the user as afforded by the approach presented is that content processing devices may feature a personalized content channel for enabling immediate access to preferred content.

The processes described herein for personalizing the content viewing and selection process for a user of a set-top box may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
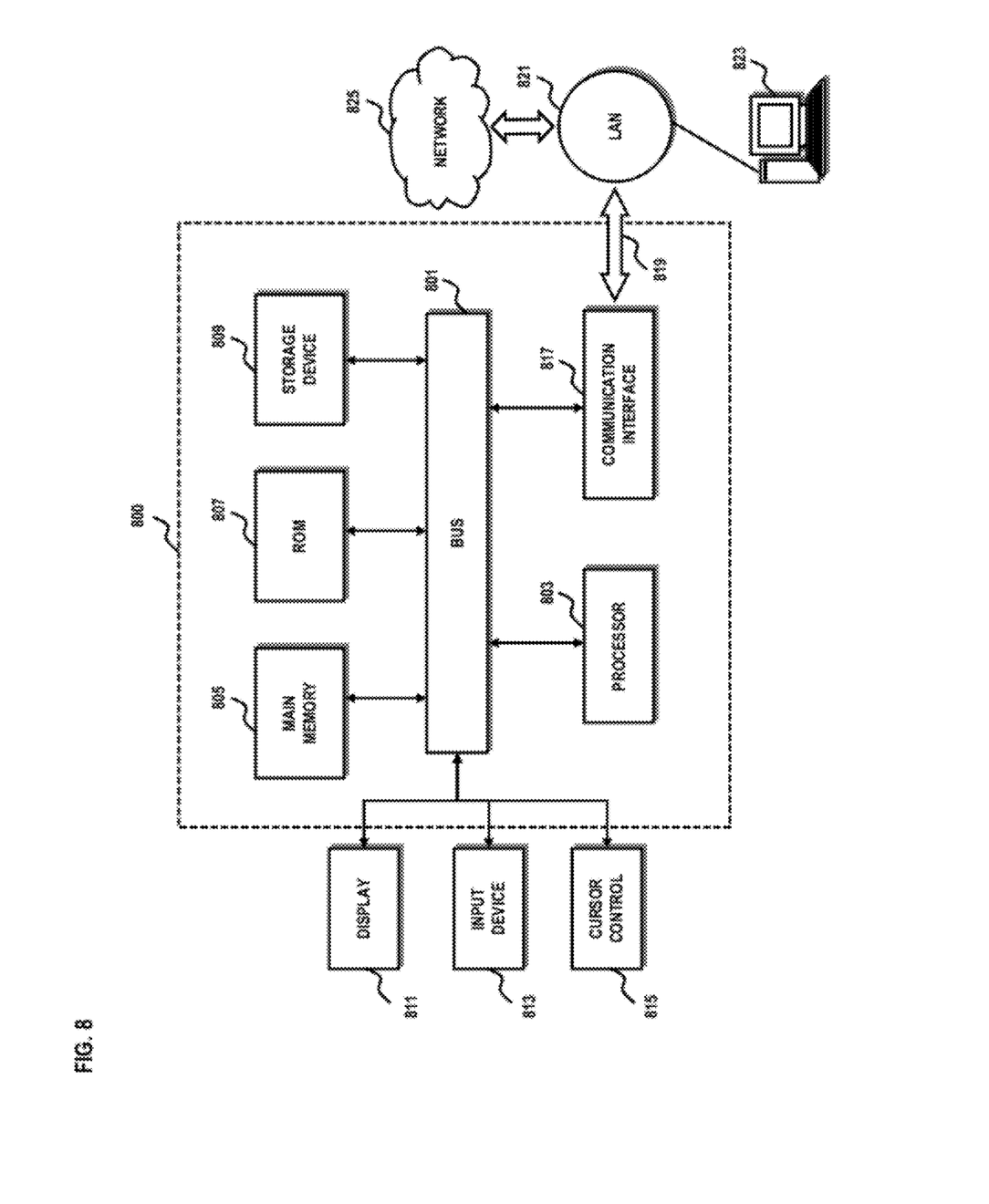
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage media ((or non-transitory media)—i.e., non-volatile media and volatile media), and transmission media.

Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
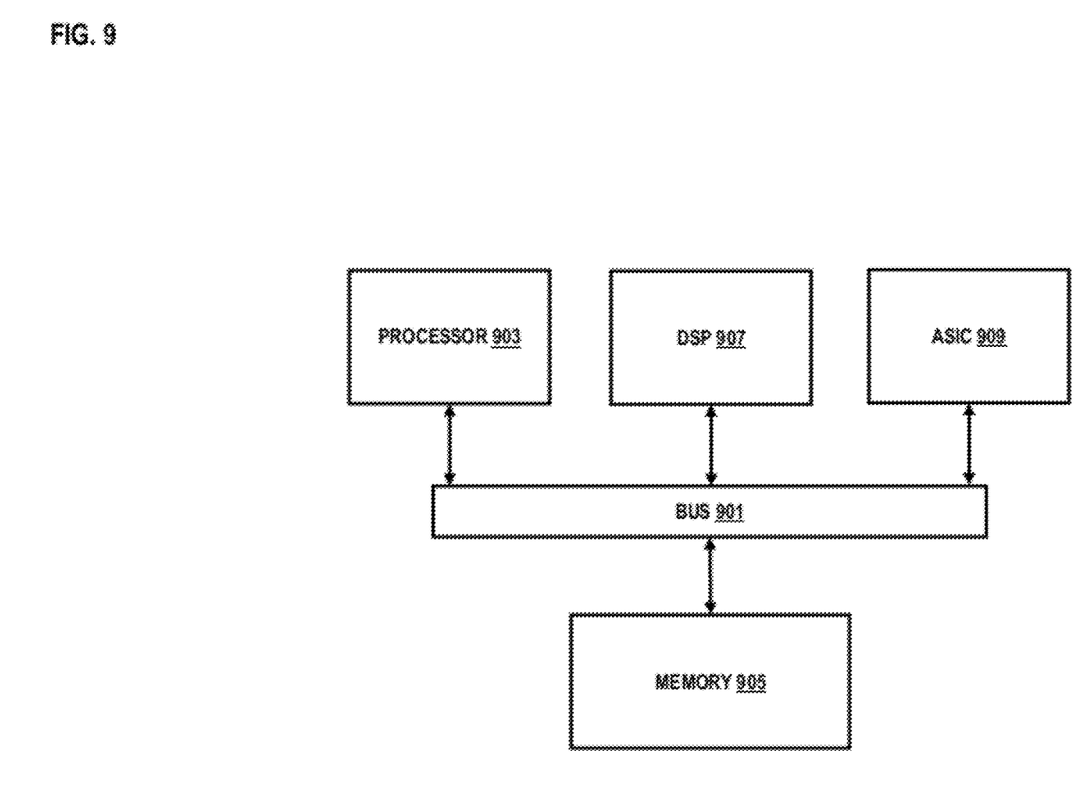
FIG. 9 is a diagram of a chip set that can be used to implement various exemplary embodiments.

FIG. 9 illustrates a chip set 900 upon which an embodiment of the invention may be implemented. Chip set 900 is programmed to present a personalized channel as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3A-3D.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
  retrieving viewing data related to content experienced by a user;
  selecting broadcast content based on the viewing data from a plurality of programs that are designated to broadcast to a plurality of set-top boxes;
  presenting a personalized content selector over the first personalized program within the personalized programming channel, the personalized content selector presenting additional personalized programs among the selected broadcast content related to what user is currently watching according to user preferred genres for selecting by the user;
  receiving a skip command at the particular set-top box for selecting a second personalized program from the additional personalized programs;
  and presenting, via the particular set-top box, the second personalized program over the personalized programming channel in response to the skip command.

2. A method according to claim 1, further comprising:
  presenting a program guide via the particular set-top box; and
  receiving a command to navigate to the personalized programming channel within the program guide.

3. A method according to claim 2, wherein the broadcast content includes a television program and a live broadcast program, and the presentation of the personalized programming channel is initiated using a hot button on the particular set-top box or on a remote control device that is configured to communicate with the particular set-top box.

4. A method according to claim 1, further comprising:
  receiving preference data from a web portal that specifies user preferences in the content experienced by the user, wherein the selected broadcast content is based on the viewing data and the preference data.

5. A method according to claim 1, further comprising:
  designating a predetermined number of personalized programs for the personalized programming channel.

6. A method according to claim 5, further comprising:
  determining that the second personalized program is unauthorized for the particular set-top box; and selectively initiating a subscription procedure based on the determination to permit presentation of the second personalized program on the particular set-top box.

7. A method according to claim 6, wherein the subscription procedure is performed in real-time to subscribe the user to a service providing the second personalized program.

8. A method according to claim 1, further comprising:
wherein the additional personalized programs are presented in association with visual images according to one of images from the additional personalized programs, logos of corresponding network stations of the personalized programs, and trailer of the additional personalized programs.

9. An apparatus comprising:
at least one processor; and
at least one memory including computer program code for one or more programs,
the at least one memory and the computer program code configured to, with the at least one processor, cause the apparatus to perform at least the following,
retrieve viewing data related to content experienced by a user,
select broadcast content based on the viewing data and the preference data from a plurality of programs that are designated to broadcast to a plurality of set-top boxes,
present a first personalized program over a personalized programming channel for the user using the selected broadcast content via a particular one of the set-top boxes associated with the user,
present a personalized content selector over the first personalized program within the personalized programming channel, the personalized content selector presenting additional personalized programs among the selected broadcast content related to what user is currently watching according to user preferred genres for selecting by the user,
receive a skip command at the particular set-top box for selecting a second personalized program from the additional personalized programs, and
present, via the particular set-top box, the second personalized program over the personalized programming channel in response to the skip command.

10. An apparatus according to claim 9, wherein the apparatus is further caused to:
present a program guide via the particular set-top box; and
receive a command to navigate to the personalized programming channel within the program guide.

11. An apparatus according to claim 10, wherein the broadcast content includes a television program and a live broadcast program, and the presentation of the personalized programming channel is initiated using a hot button on the particular set-top box or on a remote control device that is configured to communicate with the particular set-top box.

12. An apparatus according to claim 9, wherein the apparatus is further caused to:
receive preference data from a web portal that specifies user preferences in the content experienced by the user, wherein the selected broadcast content is based on the viewing data and the preference data.

13. An apparatus according to claim 9, wherein the apparatus is further caused to:
designate a predetermined number of personalized programs for the personalized programming channel.

14. An apparatus according to claim 13, wherein the apparatus is further caused to:
determine that the second personalized program is unauthorized for the particular set-top box; and
selectively initiate a subscription procedure based on the determination to permit presentation of the second personalized program on the particular set-top box.

15. An apparatus according to claim 14, wherein the subscription procedure is performed in real-time to subscribe the user to a service providing the second personalized program.

16. An apparatus according to claim 9,
wherein the additional personalized programs are presented in association with visual images according to one of images from the additional personalized programs, logos of corresponding network stations of the personalized programs, and trailer of the additional personalized programs.

17. A set-top box device comprising:
a processor configured to retrieve viewing data related to content experienced by a user and to select broadcast content based on the viewing data from a plurality of programs; and
a presentation module configured to present a first personalized program over a personalized programming channel for the user using the selected broadcast content, present a personalized content selector over the first personalized program within the personalized programming channel, the personalized content selector presenting additional personalized programs among the selected broadcast content related to what user is currently watching according to user preferred genres for selecting by the user,
and to present a second personalized program from among the additional personalized programs over the personalized programming channel in response to a skip command.

18. A set-top box device according to claim 17, wherein the broadcast content includes a television program and a live broadcast program, and the presentation module is further configured to present a program guide including the personalized programming channel, and the communication interface is further configured to receive a command to navigate to the personalized programming channel within the program guide.

19. A set-top box device according to claim 17, further comprising:
a communication interface configured to receive preference data corresponding to a user profile from a web portal that specifies user preferences in the content experienced by a user associated with the user profile, wherein the processor is further configured to select the broadcast content based on the viewing data and the preference data.

20. A set-top box device according to claim 17, wherein the processor is further configured to determine that the second personalized program is unauthorized for the set-top box device, and selectively initiate a subscription procedure based on the determination to permit presentation of the second personalized program on the set-top box device.

* * * * *